(12) United States Patent
Zhu et al.

(10) Patent No.: US 12,366,754 B2
(45) Date of Patent: Jul. 22, 2025

(54) DISPLAY DEVICE, A VEHICLE WITH A DISPLAY DEVICE AND DISPLAY VIRTUAL IMAGE METHOD

(71) Applicant: Shenzhen Optiave Display Technology Co., Ltd., Shenzhen (CN)

(72) Inventors: Yisheng Zhu, Shenzhen (CN); Houqiang Jiang, Shenzhen (CN); Tapani Kalervo Levola, Shenzhen (CN)

(73) Assignee: Shenzhen Optiave Display Technology Co., Ltd., Shenzhen (CN)

( * ) Notice: Subject to any disclaimer, the term of this patent is extended or adjusted under 35 U.S.C. 154(b) by 464 days.

(21) Appl. No.: 17/895,091

(22) Filed: Aug. 25, 2022

(65) Prior Publication Data
US 2024/0027763 A1    Jan. 25, 2024

(30) Foreign Application Priority Data
Jul. 19, 2022  (CN) .......................... 202210844495.0

(51) Int. Cl.
| | |
|---|---|
| *G02B 6/00* | (2006.01) |
| *F21V 8/00* | (2006.01) |
| *G02B 26/08* | (2006.01) |
| *G02B 27/01* | (2006.01) |
| *B60K 35/00* | (2006.01) |
| *B60K 35/23* | (2024.01) |

(52) U.S. Cl.
CPC ....... *G02B 27/0149* (2013.01); *G02B 6/0016* (2013.01); *G02B 6/0038* (2013.01); *G02B 26/08* (2013.01); *G02B 27/0101* (2013.01); *B60K 35/00* (2013.01); *B60K 35/23* (2024.01); *B60K 2360/31* (2024.01); *G02B 2027/0154* (2013.01)

(58) Field of Classification Search
CPC ................................. G02B 6/00; G02B 6/01
USPC ............................................................ 385/37
See application file for complete search history.

(56) References Cited

U.S. PATENT DOCUMENTS 10,156,725 B2 * 12/2018 TeKolste .............. G02B 6/0025
10,908,360 B2 *  2/2021 Schultz .............. G02B 27/4272
(Continued)

FOREIGN PATENT DOCUMENTS

| CN | 105143960 A | 12/2015 |
|---|---|---|
| CN | 105487242 A | 4/2016 |
| CN | 107852488 A | 3/2018 |

*Primary Examiner* — Kaveh C Kianni

(57) ABSTRACT

A display apparatus (500) for displaying a virtual image (VIMG1) comprises: an optical engine (ENG1) to form input light (IN1), which represents an input image (IMG0), an expander device (EPE1) to form light beams ($B3_{P0,R}$, $B3_{P1,R}$) of output light (OUT1) by expanding light beams ($B0_{P0,R}$, $B0_{P1,R}$) of the input light (IN1), the expander device (EPE1) comprising: a waveguide plate (SUB1), a diffractive in-coupling element (DOE1) to form first guided light (B1a) and second guided light (B1b) by coupling input light (IN1) into the waveguide plate (SUB1), wherein the display apparatus (500) comprises a base (BASE1) and an actuating mechanism (MOTOR1) to cause rotary motion of the expander device (500) with respect to the base (BASE1), wherein an angle (γ1) between an optical axis (AX0) of the optical engine (ENG1) and the axis (AX1) of rotation of the expander device (500) is in the range of 10° to 45°.

7 Claims, 22 Drawing Sheets

(56) References Cited

U.S. PATENT DOCUMENTS

| | | | |
|---|---|---|---|
| 2018/0232048 A1* | 8/2018 | Popovich | G02B 6/105 |
| 2019/0041634 A1* | 2/2019 | Popovich | G01S 17/66 |
| 2019/0287495 A1* | 9/2019 | Mathur | G06F 3/011 |
| 2021/0011305 A1* | 1/2021 | Chang | G02B 27/0081 |
| 2021/0397004 A1* | 12/2021 | Schowengerdt | G02B 27/0172 |
| 2022/0163803 A1* | 5/2022 | Adema | H04N 9/3129 |
| 2022/0269076 A1* | 8/2022 | Yang | G02B 6/0016 |
| 2022/0269077 A1* | 8/2022 | Adema | G02B 27/0081 |
| 2022/0269079 A1* | 8/2022 | Adema | G02B 26/0833 |
| 2022/0377312 A1* | 11/2022 | Samples | H04N 13/344 |
| 2025/0093568 A1* | 3/2025 | Adema | G02B 27/286 |
| 2025/0102742 A1* | 3/2025 | Adema | G02B 27/0172 |
| 2025/0164800 A1* | 5/2025 | Schowengerdt | G02B 6/0016 |

\* cited by examiner

DISPLAY DEVICE, A VEHICLE WITH A DISPLAY DEVICE AND DISPLAY VIRTUAL IMAGE METHOD

CROSS-REFERENCE TO RELATED APPLICATIONS

The application claims priority to Chinese patent application No. 202210844495.0, filed on Jul. 19, 2022, the entire contents of which are incorporated herein by reference.

TECHNICAL FIELD

The present invention relates to a display apparatus for displaying an image.

RELATED ART

A known virtual display device comprises an optical engine and a diffractive beam expander. The optical engine forms input light beams, which correspond to a primary image displayed on a miniature display. Each input light beam propagates to a different direction, which corresponds to a different display pixel of the miniature display. The diffractive beam expander forms expanded light beams from the input light beams. The user may observe the displayed virtual image when the expanded light beams impinge on his eye.

The virtual display device has an eye box, which refers to the space where the eye can be positioned to view the displayed virtual image. If the eye is outside the eye box, then the expanded light beams do not impinge on the eye, and the eye cannot see the displayed virtual image.

It is known that the size of eye box can be enlarged by increasing the size of an out-coupling element the diffractive beam expander. However, manufacturing of a large out-coupling element may be difficult and/or expensive.

An object is to provide a display apparatus. An object is to provide a method for displaying an image. An object is to provide a method for expanding a light beam. An object is to provide a vehicle, which comprises the display apparatus.

According to an aspect, there is provided a display apparatus (500) for displaying a virtual image (VIMG1), the display apparatus (500) comprising:
  an optical engine (ENG1) to form input light (IN1), which represents an input image (IMG0),
  an expander device (EPE1) to form light beams ($B3_{P0,R}$, $B3_{P1,R}$) of output light (OUT1) by expanding light beams ($B0_{P0,R}$, $B0_{P1,R}$) of the input light (IN1),
  the expander device (EPE1) comprising:
  a waveguide plate (SUB1),
  a diffractive in-coupling element (DOE1) to form first guided light (B1a) and second guided light (B1b) by coupling the input light (IN1) into the waveguide plate (SUB1),
  a first out-coupling element (DOE3a) to form output light (OUT1) by coupling the first guided light (B1a) out of the waveguide plate (SUB1), and
  a second out-coupling element (DOE3b) to form output light (OUT1) by coupling the second guided light (B1b) out of the waveguide plate (SUB1),
  wherein the display apparatus (500) comprises a base (BASE1) and an actuating mechanism (MOTOR1) to cause rotary motion of the expander device (500) with respect to the base (BASE1),
  wherein an angle ($\gamma 1$) between an optical axis (AX0) of the optical engine (ENG1) and the axis (AX1) of rotation of the expander device (500) is in the range of 10° to 45°.

According to an aspect, there is provided an apparatus according to claim 1.

Further aspects are defined in the other claims.

The scope of protection sought for various embodiments of the invention is set out by the independent claims. The embodiments, if any, described in this specification that do not fall under the scope of the independent claims are to be interpreted as examples useful for understanding various embodiments of the invention.

The display apparatus comprises an optical engine to form an input image, a diffractive expander device to extend exit pupil of the optical engine, and a motor to rotate the expander device.

The rotation of the expander device may provide a large light-emitting display region, which is equivalent to a large hypothetical out-coupling element. The rotating expander device may provide an enlarged display area. The area of the display region may be substantially greater than the area of the out-coupling elements of the expander device.

The rotating expander device may enlarge the imaging area of the optical engine so that the display apparatus may emit output light from the entire region swept by the out-coupling elements. In this way, a large eye box display effect can be achieved through a small-area exit pupil. The display apparatus may provide a large eye box by using the smaller out-coupling elements.

Optical coupling from the optical engine to a predetermined region of the display area may be made more efficient by using a tilted orientation of the expander device. The axis of rotation of the expander device may be inclined with respect to the optical axis of the optical engine. The tilt angle ($\gamma_1$) between the axis of rotation of the expander device and the optical axis of the optical engine may be e.g. in the range of 10° to 45°. The tilt angle may have an effect on distribution of light to upper and lower regions of the display area. The inclined orientation of the rotation axis may allow increasing the maximum brightness of the display area, and/or may allow reducing the brightness of the input image.

The tilt angle may have an effect on in-coupling of light, and on the distribution of in-coupled light between the upper and lower regions of the display area. The inclined rotation axis may increase optical coupling to an upper region of the display area, and the inclined rotation axis may decrease optical coupling to a lower region of the display area.

In an embodiment, only the upper bright region of the display area may be visible to a user, wherein the lower dim region may be hidden e.g. behind a cover. The upper region may be used as a wide display area.

In an embodiment, the upper region of the display area may project light towards the eyes of the user, wherein light projected from the lower region may be blocked.

The optical engine may provide input light, which corresponds to the input image. The expander device comprises a waveguide plate, an in-coupling element to form first guided light and second guided light by diffracting the input light into the waveguide plate, a first out-coupling element to form output light by diffracting the first guided light out of the waveguide plate, and a second out-coupling element to form output light by diffracting the second guided light out of the waveguide plate. The user may observe the displayed virtual image when the output light impinges on the eye of the user.

The input light may comprise a plurality of input light beams. The output light may comprise a plurality of output light beams. The grating vectors of the in-coupling element and grating vectors of the diffractive out-coupling elements may be selected such that the directions of the output light beams correspond to the directions of the input light beams. The diffractive elements may e.g. facilitate mass production of the expander devices.

The grating periods of the diffractive elements may be selected such that a first output light beam formed by the first out-coupling element may be parallel with a second output light beam formed by the second out-coupling element, in a situation where said output light beams correspond to the same image point of the displayed image.

The rotation speed of the expander device may be selected to be high enough, so as to reduce a visually detectable flickering effect. The rotation speed $f_{RPM}$ may be e.g. higher than 20 revolutions per second. When using two out-coupling elements, the flickering frequency of the displayed image may be equal to two times the rotation speed $f_{RPM}$ of the expander device. When the flickering frequency exceeds the time resolution of the human eye, then the entire display region defined by the rotating expander device may be regarded as a visually uniform display surface.

In an embodiment, the display apparatus may be a vehicle-mounted head-up display. The display apparatus may be used as a vehicle-mounted head-up display. The large eye box of the display apparatus may facilitate viewing the displayed virtual image e.g. in a situation where the vehicle is driven on a road and the head of the user moves according to the movements of the vehicle.

DETAILED DESCRIPTION OF THE EMBODIMENTS

Figure 1A:
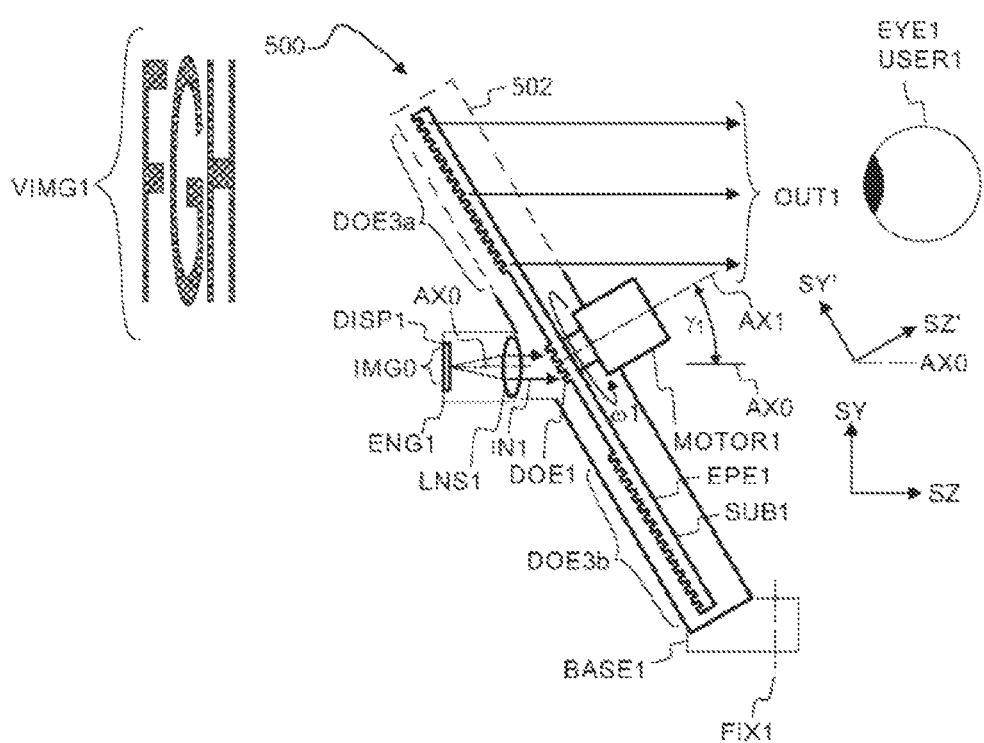
FIG. 1a shows, by way of example, in a side view, a display apparatus.

Referring to FIGS. 1a to 1d, the display apparatus 500 may comprise an optical engine ENG1 to form input light IN1, an expander device EPE1 to form output light OUT1 by expanding input light IN1, and a motor MOTOR1 to provide an enlarged display region REG1 by rotating the expander device EPE1.

A user USER1 of the display apparatus 500 may observe a displayed virtual image VIMG1 when the output light OUT1 impinges on the eye EYE1 of the user.

The input light IN1 may comprise a plurality of light beams propagating in different directions. Each light beam of the input light IN1 may correspond to a different point of the input image IMG0. The input light beams may together constitute input light IN1.

The output light OUT1 may comprise a plurality of light beams propagating in different directions. The output light OUT1 may comprise a plurality of output light beams corresponding to different points of the virtual image VIMG1. The expander device EPE1 may form the output light OUT1 from the input light IN1 such that the directions and the intensities of the light beams of the output light OUT1 correspond to the points of the input image IMG0. The expander device may expand light of the input light beams. The expander device EPE1 may form the output light beams by diffractively expanding the input light beams of the input light IN1. Each output light beam may propagate in the same direction as the corresponding input light beam. Consequently, the displayed virtual image VIMG1 may represent the input image IMG0.

A light beam of the input light IN1 may correspond to a single image point (e.g. point P0) of a displayed image. The expander device EPE1 may form an output light beam from a light beam of the input light IN1 such that the direction $(k3_{P0,R})$ of the output light beam is parallel with the direction $(k0_{P0,R})$ of the corresponding light beam of the input light IN1. A light beam corresponding to a different image point may propagate in a different direction. Directions and image points are shown e.g. in FIGS. 4a to 4i.

The optical engine ENG1 may form input light IN1, which corresponds to an input image IMG0. The optical engine ENG1 may form input light IN1, which represents an input image IMG0. The input light IN1 may comprise a plurality of input light beams propagating in different directions corresponding to different image points of the input image IMG0. The optical engine ENG1 may comprise a display DISP1 and collimating optics LNS1 to form the input light beams. The optical engine ENG1 may project the input light IN1 to the in-coupling element DOE1. The optical engine ENG1 may also be called e.g. as a projector.

The rotating expander device EPE1 may comprise a waveguide plate SUB1, which in turn may comprise an in-coupling element DOE1, and out-coupling elements DOE3a, DOE3b. The in-coupling element DOE1 may couple the input light IN1 into the waveguide plate SUB1. The input light IN1 may impinge on the in-coupling element DOE1. The input light IN1 may overlap the in-coupling element DOE1.

The axis AX1 of rotation may intersect the in-coupling element DOE1. The in-coupling element DOE1 may be concentric with the axis AX1 of rotation. The optical axis AX0 of the optical engine ENG1 may intersect the in-coupling element DOE1. A distance between the optical axis AX0 and the center of the in-coupling element DOE1 may be e.g. smaller than 5% of the maximum width ($w_{SUB1}$) of the waveguide plate SUB1. In particular, the optical axis AX0 may intersect the center of the in-coupling element DOE1.

Each element DOE1, DOE3a, DOE3b may comprise one or more diffraction gratings. The gratings may be e.g. on the first and/or on the second surface of the waveguide plate SUB1. The elements DOE1, DOE3a, DOE3b may be diffractive elements. The in-coupling element DOE1 may form guided light B1a, B1b by diffracting the input light IN1. The guided light B1a, B1b may propagate as waveguided light in the waveguide plate SUB1.

The out-coupling elements DOE3a, DOE3b may form output light OUT1 by diffracting the guided light B1a, B1b out of the waveguide plate SUB1. The out-coupling elements DOE3a, DOE3b may operate as a pair of elements. The out-coupling elements DOE3a, DOE3b may be on opposite sides of the in-coupling element DOE1.

The expander device EPE1 may be arranged to expand a viewing pupil of the display apparatus 500, so as to facilitate keeping the eye EYE1 of the user USER1 in a suitable transverse position with respect to the display apparatus 500.

$\gamma_1$ denotes the tilt angle between the optical axis AX0 of the optical engine ENG1 and the axis AX1 of rotation of the expander device EPE1. The tilt angle $\gamma_1$ may be e.g. in the range of 10° to 45°. In particular, the tilt angle $\gamma_1$ may be e.g. in the range of 20° to 35°. The tilt angle $\gamma_1$ may be e.g. substantially equal to 30°. The inclined rotation axis AX1 may cause that the input light IN1 is coupled mainly to an upper region of the display area. Thus, the inclined rotation axis AX1 may increase brightness of the upper display region, and/or may allow reducing the brightness of the input image IMG0. Reducing the brightness of the input image IMG0 may allow reducing optical and electrical power of the optical engine ENG1.

The expander device EPE1 may be arranged to rotate with respect to a stationary base BASE1. The display apparatus 500 may be mounted e.g. to a vehicle 1000 via the base BASE1. The display apparatus 500 may be mounted to a vehicle 1000 e.g. via one or more joints FIX1. The joints may be e.g. adhesive joints and/or screw joints.

The optical engine ENG1 may have a fixed position with respect to the base BASE1. The optical engine ENG1 may be fixedly mounted to the base BASE1. The optical engine ENG1 may be stationary with respect to the base BASE1. The expander device EPE1 may be arranged to move with respect to the stationary base BASE1. The expander device EPE1 may be rotatable with respect to the stationary base BASE1. The expander device EPE1 may be arranged to rotate and/or oscillate with respect to the stationary base BASE1.

The display apparatus 500 may comprise an actuating mechanism MOTOR1 to cause rotary motion of the expander device EPE1 with respect to the stationary base BASE1. The actuating mechanism MOTOR1 may be directly or indirectly connected to the base BASE1. The actuating mechanism MOTOR1 may be connected to the base BASE1 e.g. via a protective cover 502 and/or via a frame. The actuating mechanism MOTOR1 may be e.g. a motor. The actuating mechanism MOTOR1 may be e.g. an electric motor or a pneumatic turbine. The motor MOTOR1 may rotate the expander device EPE1 about an axis AX1 of rotation. The expander device EPE1 may rotate at an angular velocity $\omega_1$, which corresponds to a speed of rotation $f_{RPM}$.

The optical engine ENG1 may be mechanically connected to the base BASE1 e.g. via a protective cover 502. The protective cover may be transparent or semi-transparent. For example, a transparent cover 502 may comprise clear glass or plastic. For example, semi-transparent cover 502 may comprise mesh, which has a see-through property. The protective cover 502 may also prevent the user from accidentally touching the rotating expander device EPE1.

The optical engine ENG1 may be mechanically connected to the base BASE1 also via a connecting structure. In an embodiment, the connecting structure may be an open structure. It is not always necessary to protect the rear side of the rotating expander device EPE1.

The in-coupling element DOE1 may receive input light IN1, and the out-coupling elements may provide output light OUT1. The input light IN1 may comprise a plurality of light beams propagating in different directions. The output light OUT1 may comprise a plurality of expanded light beams (B3) formed from the light beams (B0) of the input light IN1.

The expander device EPE1 forms an output light OUT1 by expanding input light IN1. The width of the light beams of the output light OUT1 may be greater than the width of the light beams of the input light IN1.

When rotating, the expander device EPE1 may sequentially increase the horizontal cross-sectional dimension and the vertical cross-sectional dimension of the output light beams of the output light OUT1. When rotating, the expander device EPE1 may effectively expand the input light IN1 in two dimensions (e.g. in the direction SX and in the direction SY). The expansion process may also be called as exit pupil expansion. The expander device EPE1 may be called as a beam expander device or as an exit pupil expander.

The in-coupling element DOE1 may form guided light B1 by coupling input light IN1 into the waveguide plate SUB1. The in-coupling element DOE1 may form guided light B1a,B1b by coupling input light IN1 into the waveguide plate SUB1. The guided light B1, B1a, B1b may be waveguided within the planar waveguide plate SUB1. The B1, B1a, B1b may be confined to the plate SUB1 by total internal reflection. The term "guided" may mean that the light propagates within the planar waveguide plate SUB1 so that the light is confined to the plate by total internal reflection (TIR). The waveguide plate SUB1 operates as a light guide. The term "guided" may mean the same as the term "waveguided".

SX, SY and SZ denote orthogonal directions of a first coordinate system. The optical axis AX0 of the optical engine ENG1 is parallel with the direction SZ. The directions SX and SY are perpendicular to the optical axis AX0.

SX, SY' and SZ' denote orthogonal directions of a second coordinate system. The direction SZ' is parallel with the axis AX1 of rotation of the expander device EPE1. The directions SX and SY' are perpendicular to the axis AX1. The second coordinate system (SX, SY', SZ') is tilted with respect to the first coordinate system (SX, SY, SZ). The direction SX of the second coordinate system may be parallel with the direction SX of the first coordinate system.

The waveguide plate SUB1 may be parallel with a plane defined by the directions SX and SY'.

The expander device EPE1 may be rotatable relative to the base BASE1. The in-coupling element DOE1 may be concentric with the axis AX1 of rotation.

The actuating mechanism MOTOR1 may be arranged to rotate the waveguide plate SUB1 at a rotation speed $f_{RPM}$, which is e.g. in the range of 5 to 200 revolutions per second.

For example, the motor MOTOR1 may be arranged to rotate the expander device EPE1 so that the rotation speed $f_{RPM}$ of the expander device EPE1 is greater than or equal to 30 revolutions per second. Consequently, it may be difficult to visually detect flickering of the displayed image VIMG1.

For example, the motor MOTOR1 may be arranged to rotate the expander device EPE1 so that the rotation speed $f_{RPM}$ of the expander device EPE1 is greater than or equal to 60 revolutions per second. Consequently, it may be more difficult to visually detect flickering of the displayed image VIMG1.

In an embodiment, the expander device EPE1 may be rotatably supported by the one or more bearings of the motor MOTOR1.

The motor MOTOR1 and the optical engine ENG1 may be on different sides of the expander device EPE1 (FIG. 1a) or on the same side of the expander device EPE1. For example, the motor MOTOR1 may have a central opening (HOL1), so as to allow positioning the motor MOTOR1 and the optical engine ENG1 on the same side of the expander device EPE1. Consequently, the motor does not block output light OUT1.

In an embodiment, the expander device EPE1 and/or the motor MOTOR1 may block a central region of the display region REG1, so that the primary display region REG1 has a dark center.

The expander device EPE1 may be mechanically balanced with respect to the axis AX1 of rotation, so as to minimize or eliminate mechanical vibration caused by the rotation of the expander device EPE1.

The expander device EPE1 may be statically balanced so that the center of gravity of the expander device EPE1 may be on the axis AX1 of rotation.

The expander device EPE1 may be dynamically balanced so that rotation about the axis AX1 does not generate any resultant centrifugal force. The expander device EPE1 may be dynamically balanced so that rotation about the axis AX1 does not generate any significant resultant centrifugal force.

Figure 1B:
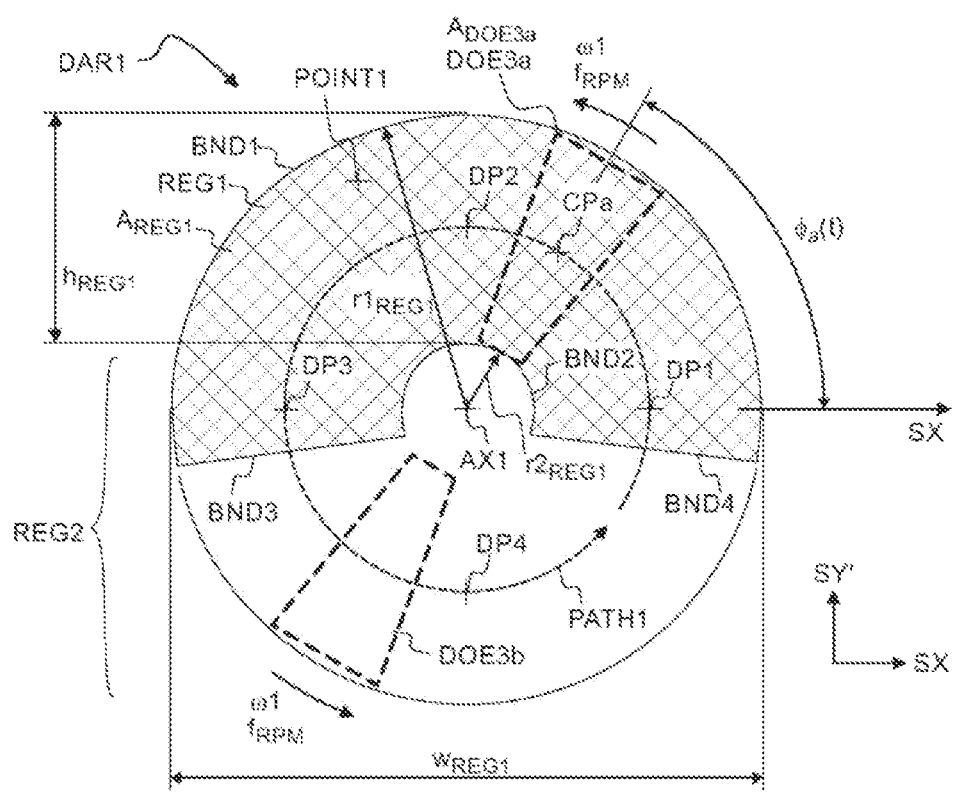
FIG. 1b shows, by way of example, in an axial view, an effective display region formed by rotating out-coupling elements.
Figure 1C:
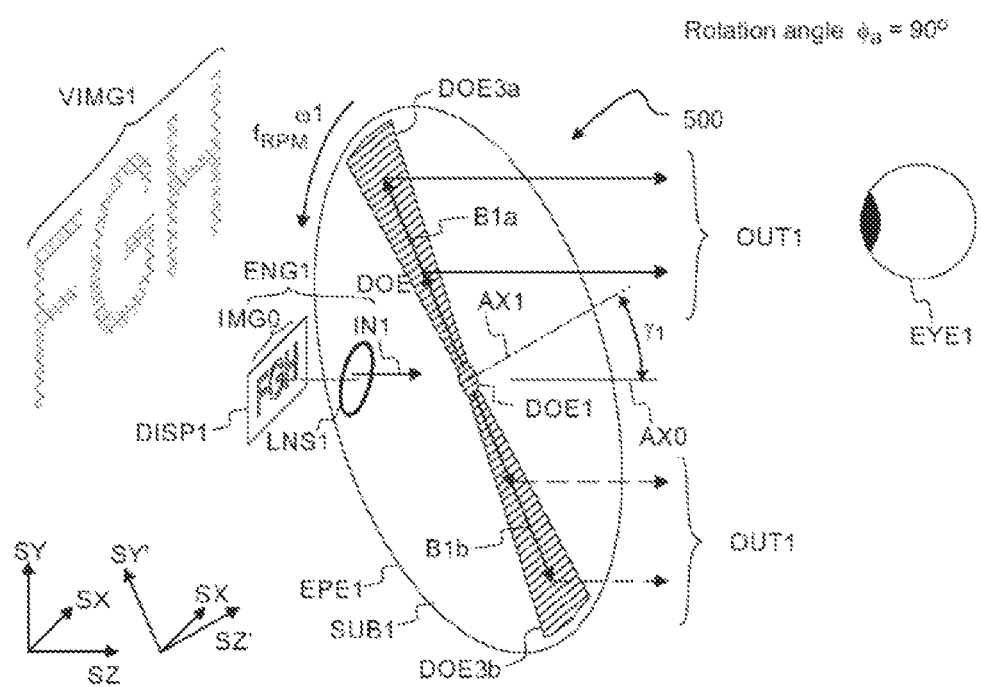
FIG. 1c shows, by way of example, in a three-dimensional view, the display apparatus when the rotation angle is 90°.
Figure 1D:
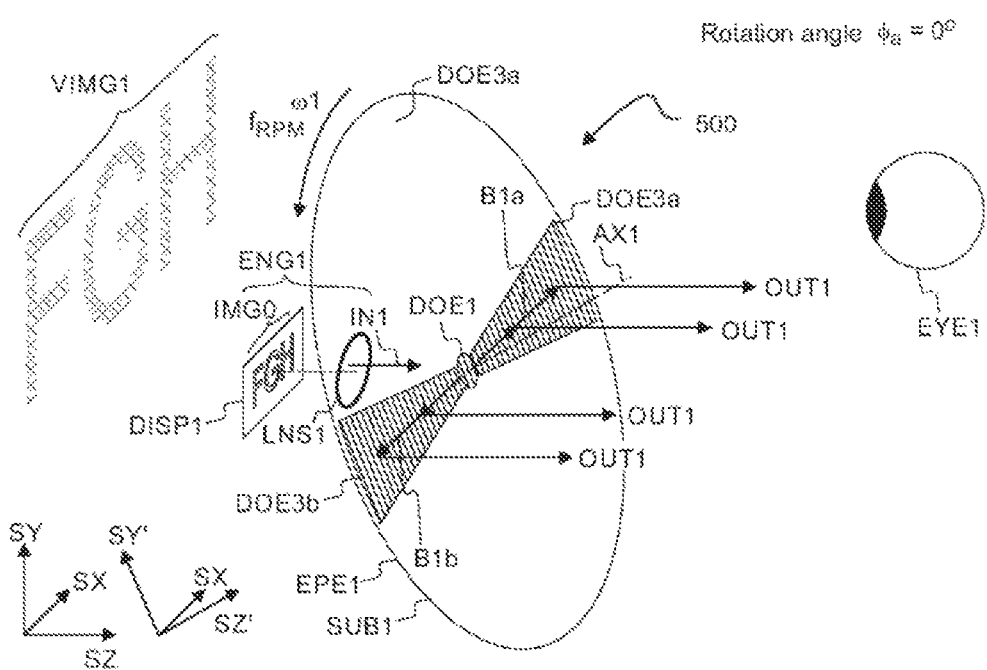
FIG. 1d shows, by way of example, in a three-dimensional view, the display apparatus when the rotation angle is 0°.

Referring to FIG. 1b, the out-coupling elements DOE3a, DOE3b may generate a large display area DAR1 by sweeping along a circular path PATH1 around the axis AX1 of rotation of the expander device EPE1.

The display area DAR1 may have a primary region REG1 and a secondary region REG2. The primary region REG1 may be e.g. an upper region of the display area DAR1, and the secondary region REG2 may be a lower region of the display area DAR1. The axis AX1 of rotation may be tilted such that the intensity of output light OUT1 projected from the primary region REG1 may be higher than the intensity of output light OUT1 projected from the secondary region REG2.

The primary region REG1 may be defined by an outer boundary BND1, by an inner boundary BND2, by a left boundary BND3 and by a right boundary BND4. The boundaries BND1, BND2 may be concentric with the axis AX1 of rotation.

The primary region REG1 may have an outer radius $r1_{REG1}$. The primary region REG1 may have an inner radius $r2_{REG1}$. The out-coupling elements DOE3a, DOE3b may define the outer boundary BND1 and/or the inner boundary BND2 of the primary region REG1. The radius $r1_{REG1}$ of the outer boundary BND1 may be e.g. in the range of 4 cm to 25 cm. The width $w_{REG1}$ of the primary display region REG1 may be e.g. in the range of 8 cm to 50 cm. The surface area $A_{REG1}$ of the primary display region REG1 may be e.g. in the range of 100 cm$^2$ to 1500 cm$^2$.

$w_{REG1}$ may denote the width of the primary region REG1. $h_{REG1}$ may denote the height of the primary region REG1 in the middle of the primary region REG1. $A_{REG1}$ denotes the effective surface area of the primary display region REG1. $A_{DOE3a}$ denotes the surface area of an out-coupling element DOE3a. $f_{RPM}$ denotes the speed of rotation of the expander device EPE1.

The rotation angle $\phi_a$ a may specify the angular position of the first out-coupling element DOE3a. The rotation angle $\phi_a(t)$ may be a function of time t. The rotation angle $\phi_a(t)$ may be determined e.g. by the following equation:

$$\phi_a(t)=\omega_1 \cdot t + C_1 \quad (1)$$

where $\omega_1$ denotes the angular speed of the rotating expander device EPE1, and $C_1$ denotes an initial angle. The rotation angle $\phi_a$ may e.g. specify an angle between the direction SX and a line drawn from the center point CPa of the element DOE3a to the axis AX1.

The center point CPa of the element DOE3a moves along a circular path PATH1 around the axis AX1. The center point CPa moves together with the rotating expander device EPE1. The display points DP1, DP2, DP3, DP4 are stationary points of the display area DAR1. The display points DP1, DP2, DP3, DP4 have a fixed position with respect to the base BASE1. DP1 denotes a first display point, which coincides with the center point CPa of the element DOE3a when the center point CPa is located at the rotation angle $\phi_a=0°$. DP2 denotes a second display point, which coincides with the center point CPa when the center point CPa is located at the rotation angle $\phi_a=90°$. DP3 denotes a third display point, which coincides with the center point CPa when the center point CPa is located at the rotation angle $\phi_a=180°$. DP4 denotes a fourth display point, which coincides with the center point CPa when the center point CPa is located at the rotation angle $\phi_a=270°$.

An arbitrary point (e.g. POINT1) of the primary display region REG1 may have a fixed position with respect to the base BASE1. The arbitrary point (POINT1) may emit output light OUT1 in a pulsed manner when the expander device EPE1 rotates so that said point (POINT1) is within the area of an out-coupling element (e.g. DOE3a). The emission of output light OUT1 from said point (POINT1) may be periodically stopped when the out-coupling element (e.g. DOE3a) moves so that the point (POINT1) is outside the area of the out-coupling elements (DOE3a, DOE3b). The speed of rotation ($f_{RPM}$) may be selected to be high enough so as to reduce or avoid visually detectable flickering of said point (POINT1) of the display region (REG1).

Each point of the primary display region REG1 may sequentially emit output light OUT1 in a pulsed manner when the out-coupling elements DOE3a, DOE3b sweep over said point. The whole primary display region REG1 may emit output light OUT1 in a pulsed manner.

Figure 2A:
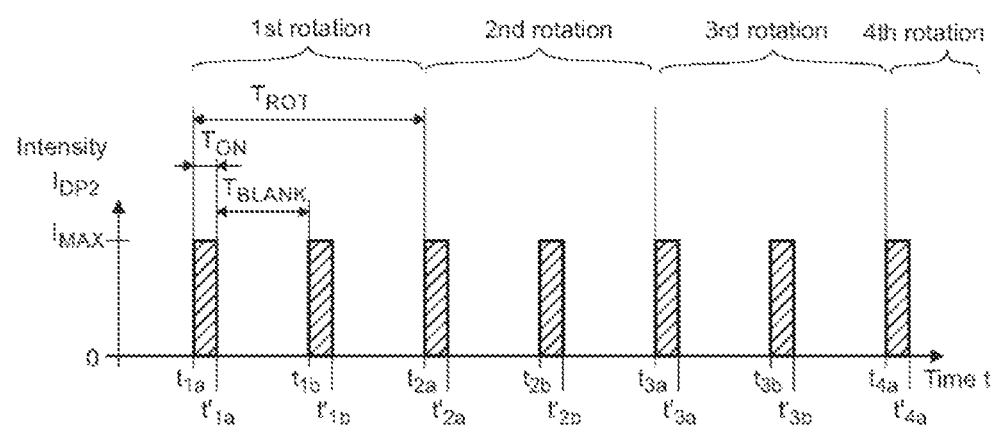
FIG. 2a shows, by way of example, a timing diagram for light emission from a predetermined point of the display region.

FIG. 2a shows, by way of example, a timing diagram for the local intensity $I_{DP2}$ of the display point DP2, when displaying a virtual image VIMG1. The DP2 appears to emit light to the eye EYE1 in a pulsed manner when the expander device EPE1 rotates. The intensity of the point POINT1 reaches a maximum value $I_{MAX}$ when the point DP2 overlaps an out-coupling element DOE3a or DOE3b. The intensity of the point DP2 is zero when the point DP2 does not overlap any of the out-coupling elements. $T_{ROT}$ denotes a time period for one full rotation of the expander device EPE1. The time period $T_{ROT}$ is equal to $1/f_{RPM}$. $T_{ON}$ denotes a time period during which the point DP2 is within the area of a moving out-coupling element. The symbol TON also denotes the duration of a light pulse emitted from the point DP2 when an out-coupling element sweeps over said point DP2. $T_{BLANK}$ denotes a time period during which the point DP2 is outside the area of the out-coupling elements. The point DP2 is within the area of the out-coupling element DOE3a between times $t_{1a},t'_{1a}$, between times $t_{2a},t'_{2a}$, between times $t_{3a},t'_{3a}$, and between times $t_{4a},t'_{4a}$. The point DP2 is within the area of the out-coupling element DOE3b between times $t_{1b},t'_{1b}$, between times $t_{2b},t'_{2b}$, and between times $t_{3b},t'_{3b}$.

Figure 2B:
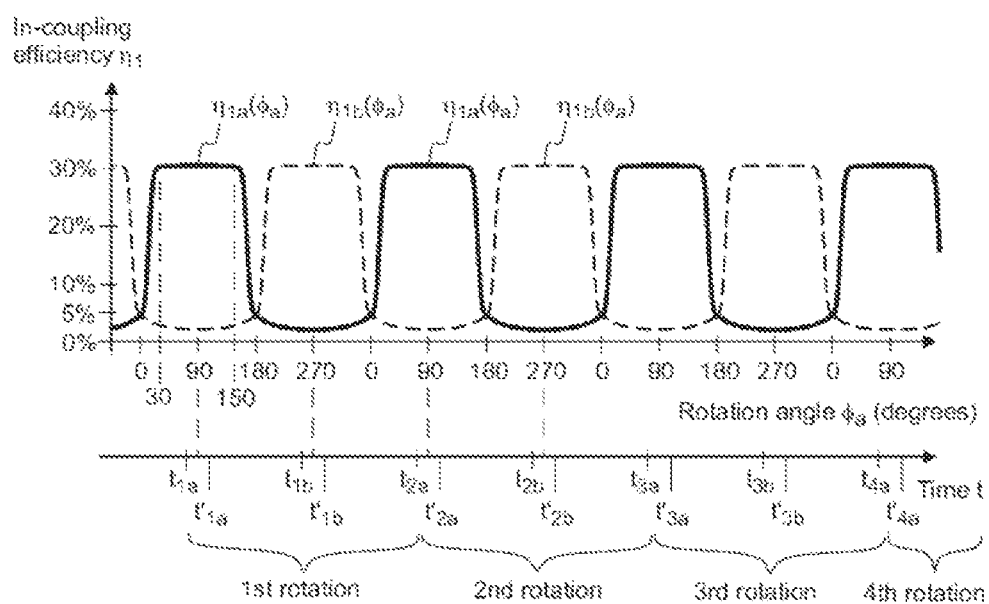
FIG. 2b shows, by way of example, temporal evolution of coupling efficiency for forming first guided light, and temporal evolution of coupling efficiency for forming second guided light.

FIG. 2b shows in-coupling efficiencies ($\eta_1$) for forming guided light from the input light. The solid curve of FIG. 2b shows, by way of example, a first coupling efficiency $\eta_{1a}(\phi_a)$ for forming first guided light B1a from the input light IN1, as a function of the rotation angle $\phi_a$. The dashed curve of FIG. 2b shows, by way of example, a second coupling efficiency $\eta_{1b}(\phi_a)$ for forming second guided light B1b from the input light IN1, as a function of the rotation angle $\phi_a$. The coupling efficiencies of FIG. 2b represent a situation where the tilt angle $\gamma_1$ is equal to 30°.

The first coupling efficiency $\eta_{1a}(\phi_a)$ may be e.g. higher than 30% when the rotation angle $\phi_a$ is in the range of 30° to 150°. The first coupling efficiency $\eta_{1a}(\phi_a)$ may be e.g. lower than or equal to 5% when the rotation angle $\phi_a$ is in the range of 180° to 360°.

The second coupling efficiency $\eta_{1b}(\phi_a)$ may be e.g. higher than 30% when the rotation angle $\phi_a$ is in the range of 210° to 330°. The coupling efficiency $\eta_{1b}(\phi_a)$ may be e.g. lower than or equal to 5% when the rotation angle $\phi_a$ is in the range of 0° to 180°.

The coupling efficiency $\eta_{1a}(\phi_a)$ may also be called as in-coupling efficiency. The coupling efficiency $\eta_{1b}(\phi_a)$ may also be called as in-coupling efficiency. The first coupling efficiency $\eta_{1a}(\phi_a)$ may mean the ratio of the power of the first guided light B1a to the ratio of the power of the input light IN1 impinging on the in-coupling element DOE1. The second coupling efficiency $\eta_{1b}(\phi_a)$ may mean the ratio of the power of the second guided light B1b to the ratio of the power of the input light IN1 impinging on the in-coupling element DOE1.

The coupling efficiencies of FIG. 2b indicate that the in-coupling element DOE1 may couple input light IN1 mainly to the primary portion REG1 of the display area DAR1. Consequently, the upper primary portion REG1 may appear to be brighter than the lower secondary portion REG2.

The left boundary BND3 and the right boundary BND4 of the primary display region REG1 may be defined based on the angular coupling efficiency functions $\eta_{1a}(\phi_a)$, $\eta_{1a}(\phi_a)$ of the expander device EPE1. For example, the right boundary BND4 may be defined by a lowermost edge of the first out-coupling element DOE3a at a first rotation angle $\phi_a$ where the coupling efficiency function $\eta_{1a}(\phi_a)$ increases to 5% (e.g. when $\phi_a$=0°). For example, the left boundary BND3 may be defined by a lowermost edge of the first out-coupling element DOE3a at a second rotation angle $\phi_a$ where the coupling efficiency function $\eta_{1a}(\phi_a)$ decreases to 5% (e.g. when $\phi_a$=180°).

Figure 3A:
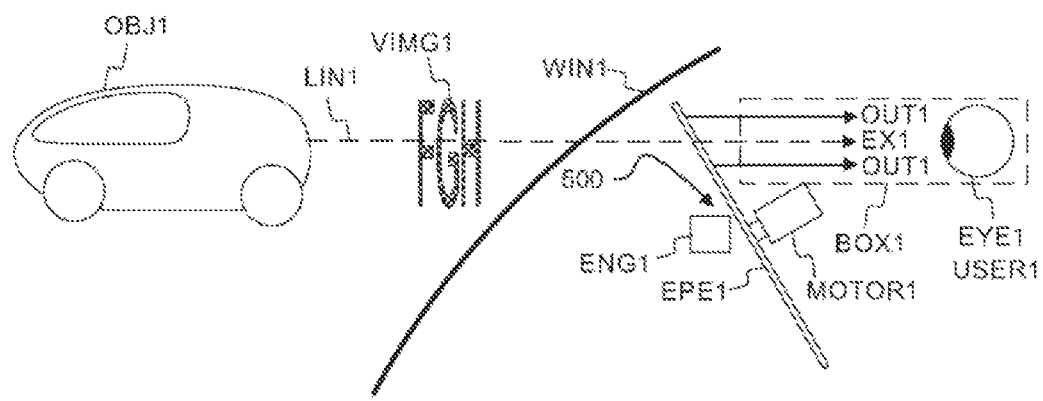
FIG. 3a shows, by way of example, in a side view, observing an external object through a window of a vehicle.
Figure 3B:
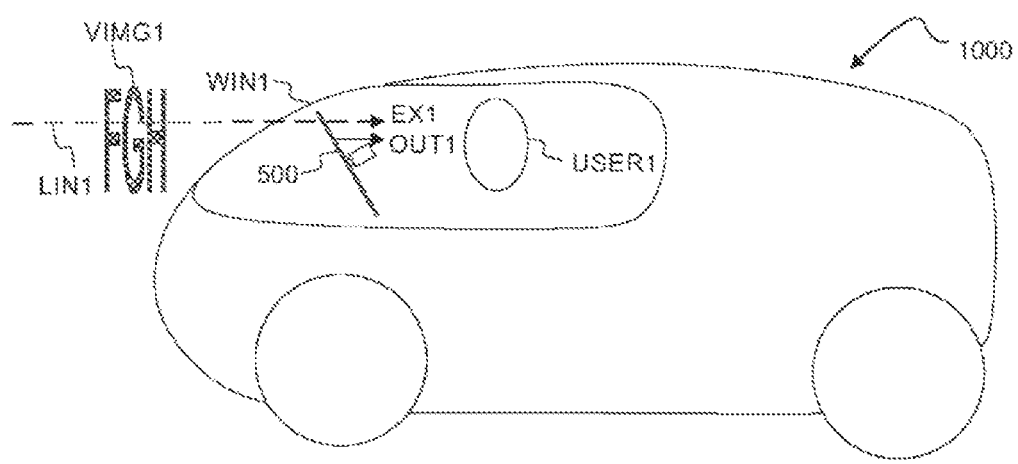
FIG. 3b shows, by way of example, in a side view, receiving external light, from the external object through the window of the vehicle.
Figure 3C:
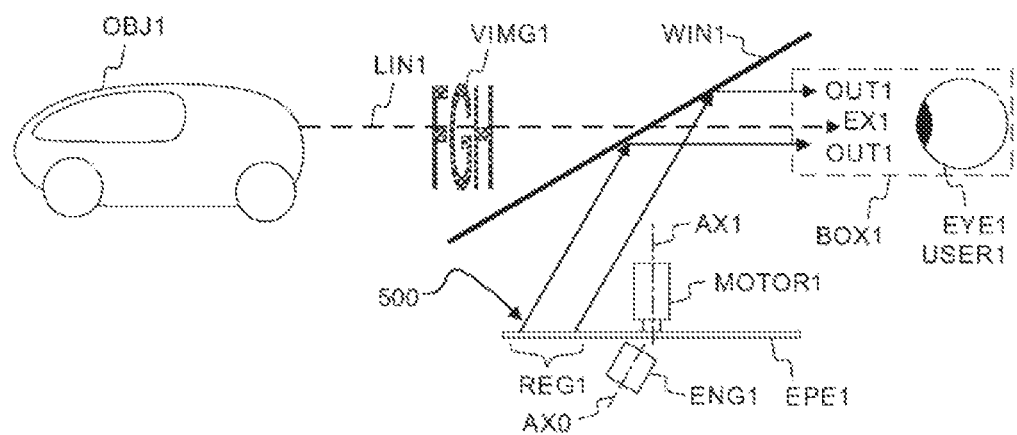
FIG. 3c shows, by way of example, in a side view, observing an external object through a window of a vehicle, wherein the window is also arranged to reflect output light towards the eye of a user.

Referring to FIGS. 3a to 3c, the display apparatus 500 may be a vehicle-mounted head-up display. A vehicle 1000 may comprise the display apparatus 500. The vehicle may be e.g. an electric car propelled by an electric motor. The vehicle may be e.g. a car propelled by an internal combustion engine. The vehicle may be e.g. a motorcycle. The vehicle may be e.g. a tram. The vehicle may be e.g. a train.

When driving a vehicle, a driver USER1 may need to observe information related to the driving. The display apparatus 500 of the vehicle may be arranged to display information about the speed of the vehicle, status of a battery, status of a motor of the vehicle, and/or navigation instructions, for example. The user USER1 of the display apparatus 500 may be the driver or a passenger of the vehicle. The user USER1 may see real objects OBJ1 and/or environment through the display region REG1, in addition to the displayed virtual images VIMG1. When using the display apparatus 500, the driver USER1 does not need to look down at the dashboard in order to observe the displayed information. When using the display apparatus 500, the driver USER1 may continuously observe the environment through the windscreen of the vehicle, without a need to look down. Avoiding the need to look down may improve driving safety. The displayed virtual image VIMG1 may represent the information, which is related to the driving. The virtual image VIMG1 formed by the display apparatus 500 may fall in front of the driver's line of sight LIN1, so that driver USER1 can observe displayed information and external objects at the same time. The driver's line of sight LIN1 may intersect the effective display area REG1 of the display apparatus 500.

Rotation of the expander device EPE1 may provide a larger display region REG1 by using smaller out-coupling elements. This may provide a large eye box BOX1 for the user USER1. The user may observe the displayed virtual image VIMG1 as long as the eye EYE1 of the user remains within the eye BOX1 of the display apparatus 500. The rotating expander device EPE1 may provide a uniform spatial intensity distribution for the output light OUT1. The rotating expander device EPE1 may provide a high image quality. The smaller out-coupling elements may be easier and/or cheaper to produce than large out-coupling elements.

The large display region REG1 may also facilitate displaying a virtual image VIMG1, which has a large angular width $\Delta\varphi$ and/or a large angular height $\Delta\theta$. Thanks to the large display region, the user may see the whole virtual image VIMG1, or at least a large part of the virtual image VIMG1 also when the distance between the eye EYE1 and the expander device EPE1 is large. The virtual image VIMG1 may cover a large field of view. The virtual image VIMG1 may comprise e.g. vehicle information and/or navigation information.

The display apparatus 500 may be mounted to the vehicle 1000 via the base BASE1. For example, the base BASE1 may be mounted to the window WIN1, to a dashboard, or to a ceiling of a vehicle 1000.

The eye EYE1 of the user USER1 may receive external light EX1 from an external object OBJ1. The user USER1 may observe the external object OBJ1 when the external light EX1 impinges on the eye EYE1. The external light EX1 may propagate through the window WIN1 and through the display area REG1 of the apparatus 500 to the eye EYE1 of the user USER1. The user USER1 may simultaneously observe the external object OBJ1 and the displayed virtual image VIMG1.

Referring to FIG. 3c, the window WIN1 may be arranged to operate as a part of the display apparatus 500. The window WIN1 may be e.g. the windscreen of the vehicle 1000. The window WIN1 may reflect the output light OUT1 towards the user EYE1 so that the user may view the displayed virtual image VIMG1, wherein the user EYE1 may simultaneously observe the environment of the vehicle 1000 through the window WIN1. For example, the line of sight LIN1 from the external object OBJ1 to the eye EYE1 may intersect the display area REG1. For example, the user may observe an external object OBJ1 through the window WIN1 so that the displayed virtual image VIMG1 may visually overlap the external object OBJ1. The driver may be visually immersed in the environment of the vehicle while viewing the displayed virtual image so that the driver does not need to look down.

The window WIN1 may be a planar (flat) transparent window or a curved transparent window. The planar window may reflect the output light OUT1 without deforming the displayed virtual image VIMG1.

A curved window may deform the displayed virtual image VIMG1. The display apparatus 500 may be arranged to at least partly compensate deformation of the virtual image VIMG1.

The window WIN1 may simultaneously transmit external light EX1 and reflect output light OUT1 to the eye EYE1 of the user USER1. The window WIN1 may operate as a semi-transparent reflector, which may simultaneously transmit external light EX1 and reflect output light OUT1. The external light EX1 may propagate through the window WIN1 to the eye EYE1.

In an embodiment, the window WIN1 may be coated with a semi-transparent reflective coating, e.g. in order to increase the intensity of the reflected output light. The coating may be e.g. a dielectric or metallic coating.

In an embodiment, the semi-transparent reflective window WIN1 may also operate based on Fresnel reflection caused by the difference between the refractive index of the window and the refractive index of air. The semi-transparent reflective window WIN1 does not need to comprise a reflective coating.

Referring to FIGS. 4a to 4e, the expander device EPE1 may form output light OUT1 by expanding input light IN1 formed by the optical engine ENG1.

The optical engine ENG1 may comprise a display DISP1 and collimating optics LNS1. The display DISP1 may be arranged to display an input image IMG0. The display DISP1 may also be called e.g. as a micro display. The display DISP1 may also be called e.g. as a spatial intensity modulator. The input image IMG0 may also be called e.g. as a primary image.

The input image IMG0 may comprise a center point P0 and four corner points P1, P2, P3, P4. P1 may denote an upper left corner point. P2 may denote an upper right corner point. P3 may denote a lower left corner point. P4 may denote a lower right corner point. The input image IMG0 may comprise e.g. the graphical characters "F", "G", and "H". The input image IMG0 may represent displayed information.

The input image IMG0 may be e.g. a single-color image. A single-color image IMG0 may be formed e.g. by modulating laser light or by modulating light obtained from one or more light emitting diodes.

The input image IMG0 may also be a multi-color image. The input image IMG0 may be e.g. an RGB image, which may comprise a red partial image, a green partial image, and a blue partial image. Each image point may provide e.g. red light, green light and/or blue light.

The optical engine ENG1 may provide input light IN1, which may comprise a plurality of substantially collimated light beams (B0). For example, each red light beam may propagate in a different direction and may correspond to a different point of the input image IMG0. Each light beam may have a color. For example, the subscript "R" may refer to the red color. For example, a red light beam $B0_{P1,R}$ may correspond to an image point P1, and may propagate in the direction of a wave vector $k0_{P1,R}$. The red light beam corresponding to the image point P1 may propagate in the direction specified by the wave vector $k0_{P1,R}$.

A red light beam $B0_{P2,R}$ may correspond to an image point P2, and may propagate in the direction of a wave vector $k0_{P2,R}$. A red light beam $B0_{P3,R}$ may correspond to an image point P3, and may propagate in the direction of a wave vector $k0_{P3,R}$. A red light beam $B0_{P4,R}$ may correspond to an image point P4, and may propagate in the direction of a wave vector $k0_{P4,R}$.

A red light beam $B0_{P0,R}$ may correspond to a central image point P0, and may propagate in the direction of a wave vector $k0_{P0,R}$.

Also a blue light beam ($B0_{P1,B}$) may correspond to the image point P1, and may propagate in the direction of a wave vector ($k0_{P1,B}$).

The input light IN1 may be formed e.g. such that the direction ($k0_{P1,B}$) of propagation of the blue light beam ($B0_{P1,B}$) corresponding to a first corner point P1 of the input image IMG0 may be parallel with the direction $k0_{P1,R}$ of propagation of the red light beam $B0_{P1,R}$.

The input light IN1 may be formed e.g. such that the direction ($k0_{P2,B}$) of propagation of a blue light beam ($B0_{P2,B}$) corresponding to a second corner point P2 of the input image IMG0 may be parallel with the direction ($k0_{P2,R}$) of propagation of a red light beam ($B0_{P2,R}$), which corresponds to said second corner point P2.

The wave vector (k) of light may be defined as the vector having a direction of propagation of said light, and a magnitude given by $2\pi/\lambda$, where $\lambda$ is the wavelength of said light.

The light $B0_{P0,R}$ of the center point P0 may propagate in an axial direction ($k0_{P0,R}$). The axial direction ($k0_{P0,R}$) may be parallel with an optical axis (AX0) of the optical engine ENG1.

Figure 4A:
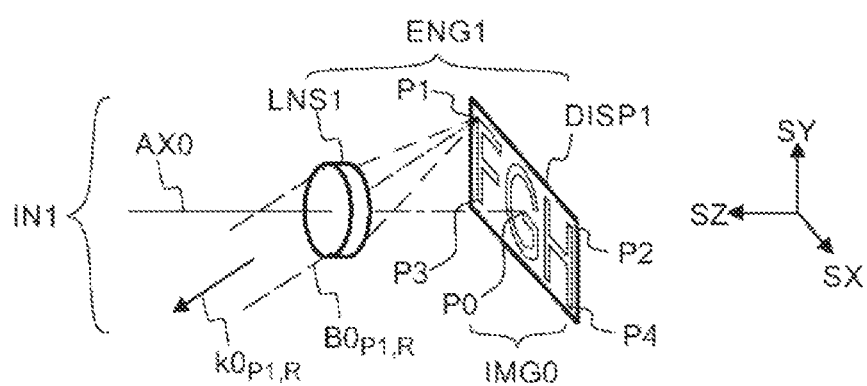
FIGS. 4a to 4e show, by way of example, in a three-dimensional view, forming, input light beams by using an optical engine.
Figure 4B:
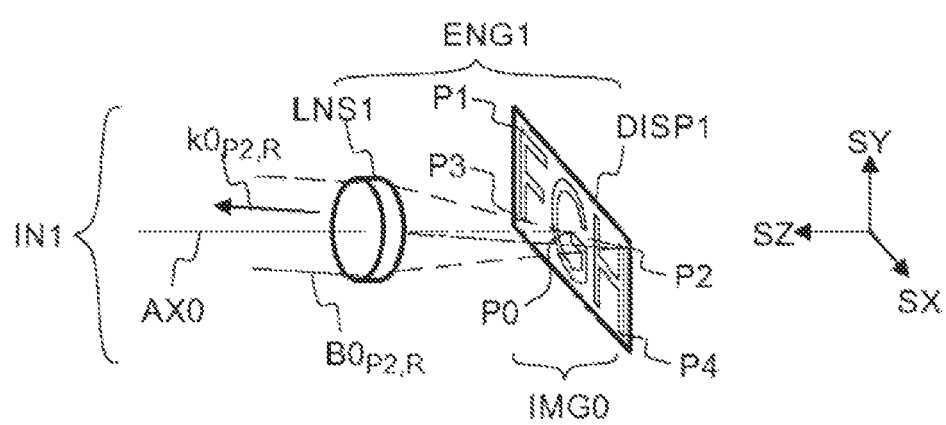
Figure 4C:
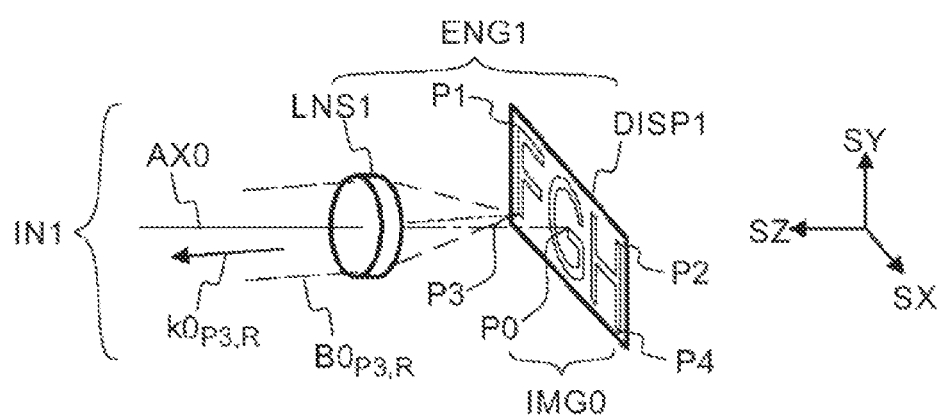
Figure 4D:
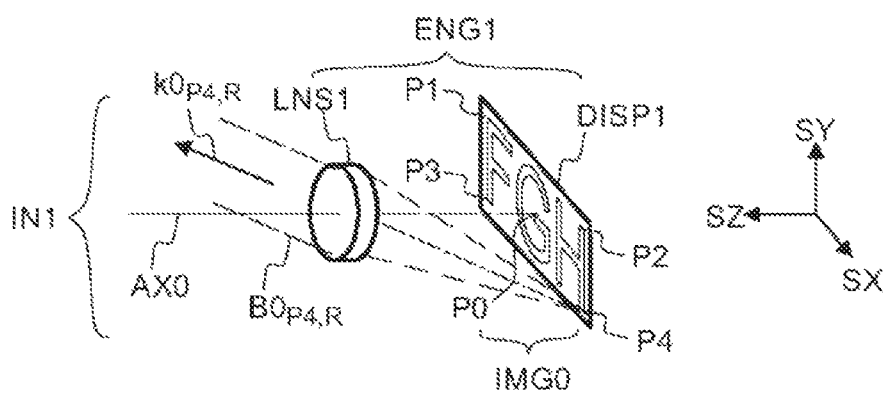
Figure 4E:
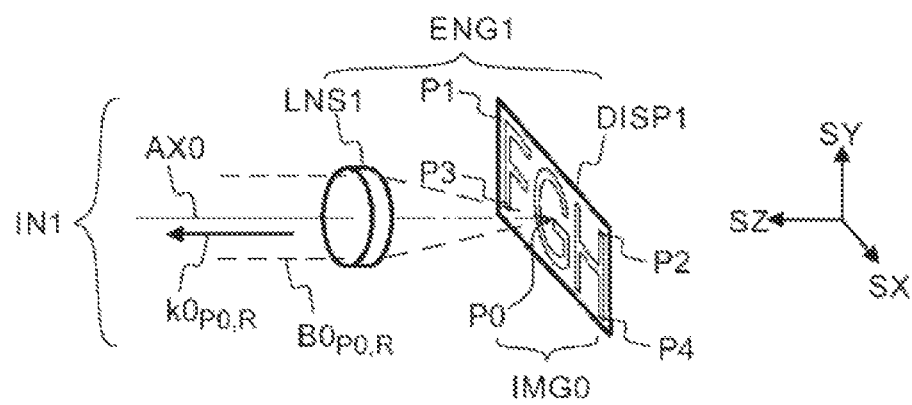
Figure 4F:
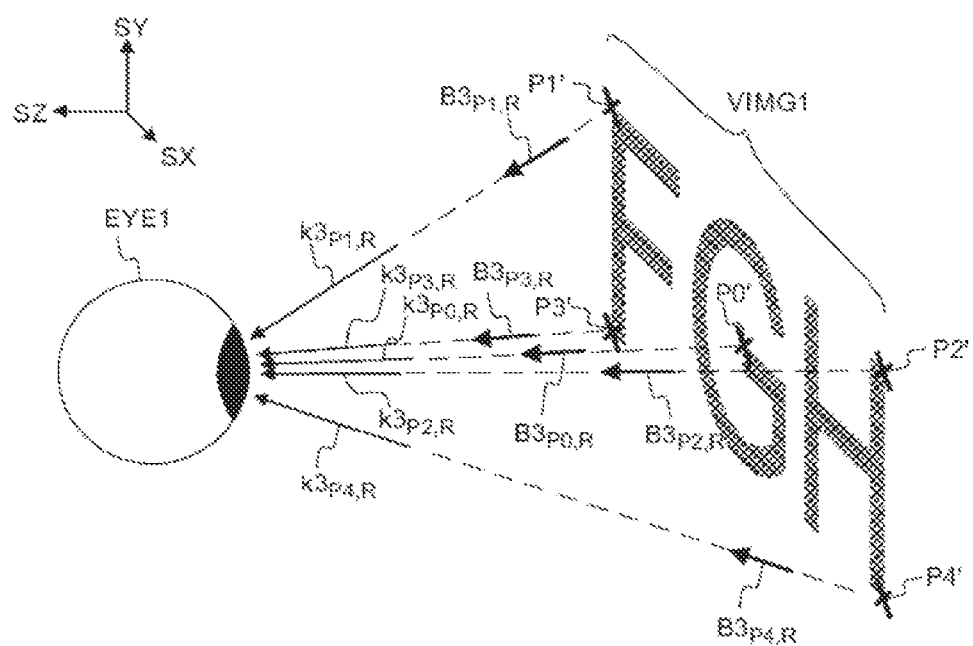
FIG. 4f shows, by way of example, in a three-dimensional view, viewing a, displayed virtual image.

Referring to FIG. 4f, the output light OUT1 may comprise a plurality of output light beams $B3_{P1,R}$, $B3_{P2,R}$, ..., which may correspond to a displayed virtual image VIMG1. Each output beam $B3_{P1,R}$, $B3_{P2,R}$, ... may correspond to a point P1', P2', ... of the image. For example, a red light beam $B3_{P0,R}$ propagating in a direction of a wave vector $k3_{P0,R}$ may correspond to a point P0' of the image VIMG1. A red light beam $B3_{P1,R}$ propagating in a direction of a wave vector $k3_{P1,R}$ may correspond to a point P1' of the image VIMG1. A red light beam $B3_{P2,R}$ propagating in a direction of a wave vector $k3_{P2,R}$ may correspond to a point P2' of the image VIMG1. A red light beam $B3_{P3,R}$ propagating in a direction of a wave vector $k3_{P3,R}$ may correspond to a point P3'. A red light beam $B3_{P4,R}$ propagating in a direction of a wave vector $k3_{P4,R}$ may correspond to a point P4'.

The expander device EPE1 may form the output light OUT1 by expanding the exit pupil of the optical engine ENG1. The output light OUT1 may comprise a plurality of output light beams, which correspond to the displayed virtual image VIMG1. The output light OUT1 may impinge on the eye EYE1 of an observer such that the observer may see the displayed virtual image VIMG1.

The displayed virtual image VIMG1 may have a center point P0' and four corner points P1', P2', P3', P4'. The input light IN1 may comprise a plurality of partial light beams corresponding to the points P0, P1, P2, P3, P4 of the input image IMG0. The expander device EPE1 may form the point P0' of the displayed virtual image VIMG1 e.g. by diffracting and guiding light of the point P0 of the input image IMG0. The in-coupling element DOE1 may be arranged to diffract input light IN1 such that the guided light B1, B1a, B1b comprises light of a center point P0 of an input image IMG0. The out-coupling element DOE3, DOE3a, DOE3b may be arranged to diffract guided light B1, B1a, B1b received from the in-coupling element DOE1 such that the output light OUT1 comprises light of the center point P0.

The expander device EPE1 may form the points P1', P2', P3', P4' e.g. by diffracting and guiding light of the points P1, P2, P3, P4, respectively.

The expander device EPE1 may form output light OUT1, which comprises a plurality of light beams $B3_{P0,R}$, $B3_{P1,R}$, $B3_{P2,R}$, $B3_{P3,R}$, $B3_{P4,R}$ propagating in different directions specified by the wave vectors $k3_{P0,R}$, $k3_{P1,R}$, $k3_{P2,R}$, $k3_{P3,R}$, $k3_{P4,R}$.

A red light beam corresponding to the point P0' of the displayed virtual image VIMG1 has a wave vector $k3_{P0,R}$. A red light beam corresponding to the point P1' has a wave vector $k3_{P1,R}$. A red light beam corresponding to the point P2' has a wave vector $k3_{P2,R}$. A red light beam corresponding to the point P3' has a wave vector $k3_{P3,R}$. A red light beam corresponding to the point P4' has a wave vector $k3_{P4,R}$.

The expander device EPE1 may expand input light IN1 such that each output light beam $B3_{P1,R}$, $B3_{P2,R}$, $B3_{P3,R}$, ... may propagate in the same direction as the corresponding input light beam $B0_{P1,R}$, $B0_{P2,R}$, $B0_{P3,R}$, .... For example, the expander device EPE1 may form an output light beam $B3_{P1,R}$ from light of an input light beam $B0_{P1,R}$ such that the output light beam $B3_{P1,R}$ propagates in the same direction as the input light beam $B0_{P1,R}$. The light beams $B0_{P1,R}$, $B3_{P1,R}$ may correspond to the same point P1 of the input image IMG0. For example, the expander device EPE1 may form an output light beam $B3_{P2,R}$ from light of an input light beam $B0_{P2,R}$ such that the output light beam $B3_{P2,R}$ propagates in the same direction as the input light beam $B0_{P2,R}$. The light beams $B0_{P2,R}$, $B3_{P2,R}$ may correspond to the same point P2 of the input image IMG0.

The expander device EPE1 may be arranged to operate such that the wave vector $k3_{P1,R}$ is parallel with the wave vector $k0_{P1,R}$ of red light of the point P1 in the input light IN1. The wave vector $k3_{P0,R}$ may be parallel with the wave vector $k0_{P0,R}$ of the point P0. The wave vector $k3_{P2,R}$ may be parallel with the wave vector $k0_{P2,R}$ of the point P2. The wave vector $k3_{P3,R}$ may be parallel with the wave vector $k0_{P3,R}$ of the point P3. The wave vector $k3_{P4,R}$ may be parallel with the wave vector $k0_{P4,R}$ of the point P4.

Figure 4G:
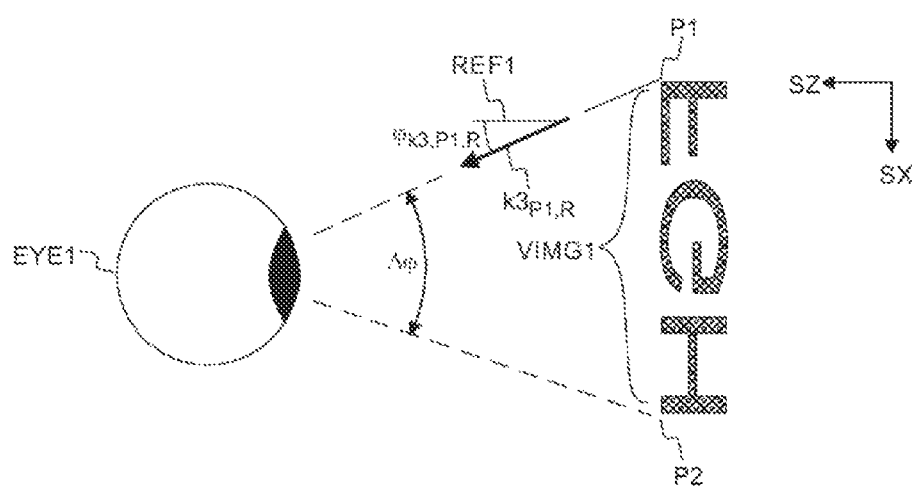
FIG. 4g shows, by way of example, angular width of the displayed virtual image.
Figure 4H:
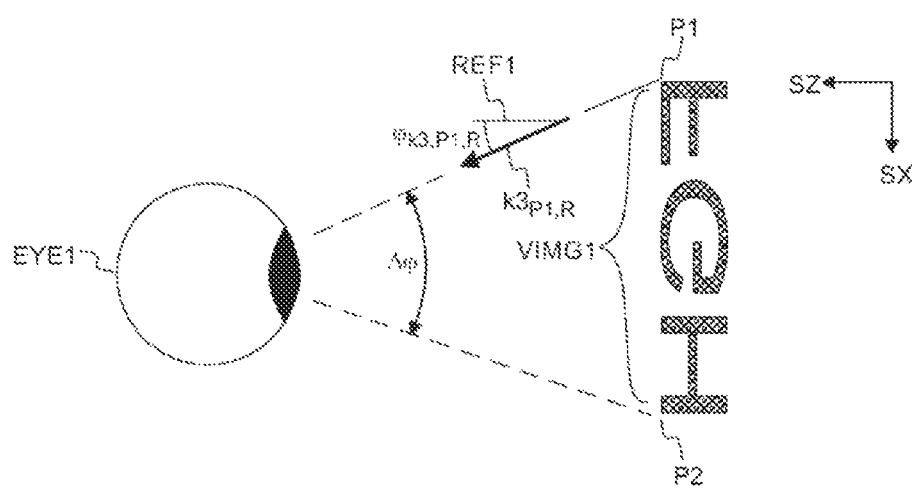
FIG. 4h shows, by way of example, angular height of the displayed virtual image.

Referring to FIGS. 4g and 4h, the displayed virtual image VIMG1 has an angular width $\Delta\varphi$ and an angular height $\Delta\theta$.

The displayed virtual image VIMG1 may have a first corner point P1' e.g. at the left-hand side of the image VIMG1, and a second corner point P2' e.g. at the right-hand side of the image VIMG1. The angular width $\Delta\varphi$ of the virtual image VIMG1 may be equal to the horizontal angle between the wave vectors $k3_{P1,R}$, $k3_{P2,R}$ of the corner points P1', P2'.

The displayed virtual image VIMG1 may have an upper corner point P1' and a lower corner point P3'. The angular height $\Delta\theta$ of the virtual image VIMG1 may be equal to the vertical angle between the wave vectors $k3_{P1,R}$, $k3_{P3,R}$ of the corner points P1', P3'.

The direction of a wave vector may be specified e.g. by orientation angles $\varphi$ and $\theta$. The angle $\varphi$ may denote an angle between the wave vector and a reference plane REF1. The reference plane REF1 may be defined e.g. by the directions SZ and SY. The angle $\theta$ may denote an angle between the wave vector and a reference plane REF2. The reference plane REF2 may be defined e.g. by the directions SZ and SX.

Figure 4I:
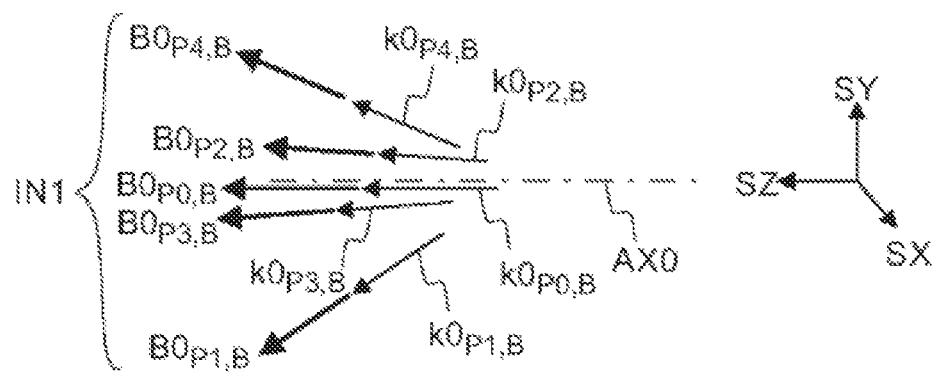
FIG. 4i shows, by way of example, wave vectors of input light beams.

Referring to FIG. 4i, the input light IN1 may comprise red light (R), green light (G) and/or blue light (B). For example, the input light IN1 may comprise blue input light beams $B0_{P0,B}$, $B0_{P1,B}$, $B0_{P2,B}$, $B0_{P3,B}$, $B0_{P4,B}$, which have wave vectors $k0_{P0,B}$, $k0_{P1,B}$, $k0_{P2,B}$, $k0_{P3,B}$, $k0_{P4,B}$, corresponding to blue points P0, P1, P2, P3, P4 of the image IMG0.

For example, the notation $k0_{P2,B}$ may refer to the wave vector of an input light beam $B0_{P2,B}$, which has blue color (B), and which corresponds to an image point P2.

The expander device EPE1 may form blue output light beams from the blue input light beams such that the wave vector of each blue output light beams is parallel with the wave vector of the corresponding blue input light beam.

Figure 5A:
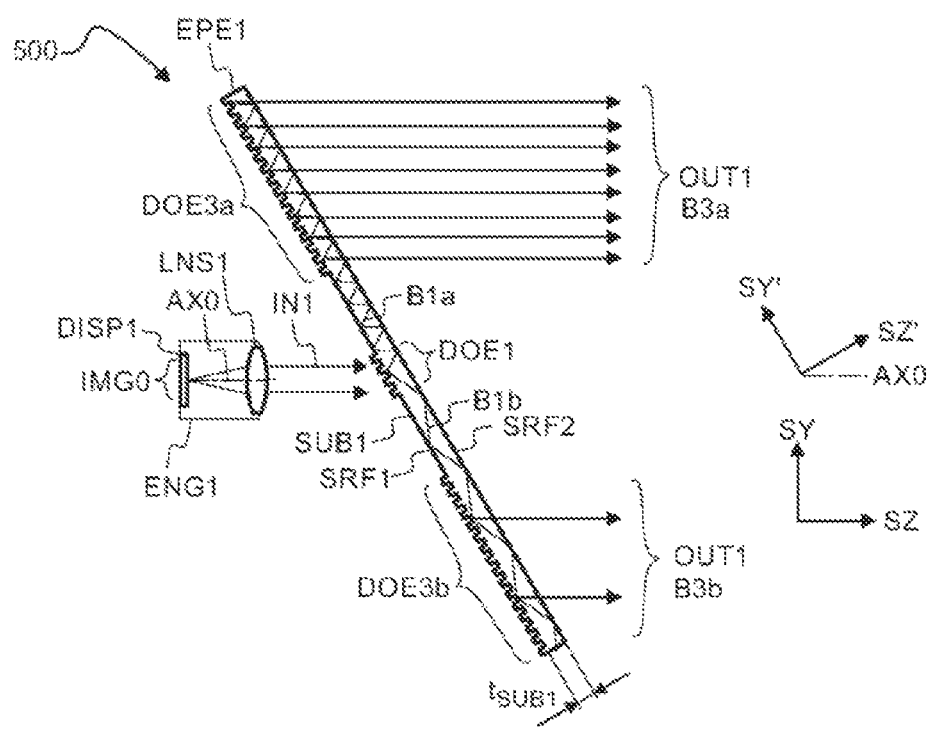
FIG. 5a shows, by way of example, in a cross-sectional side view, propagation of guided light in the waveguide plate.

Referring to FIG. 5a, the optical engine ENG1 may form an input image IMG0 and may convert the input image IMG0 into a plurality of light beams of the input light IN1. The engine ENG1 may be optically coupled to the in-coupling element DOE1 of the expander EPE1. The one or more light beams provided by the engine ENG1 may be coupled to the expander EPE1 as input light IN1. The input light IN1 may be optically coupled to the in-coupling element DOE1 of the expander device EPE1.

The first out-coupling element DOE3a may form a portion B3a of output light OUT1 by diffracting first guided light B1a out of the substrate plate SUB1. The second out-coupling element DOE3b may form a second portion B3b of output light OUT1 by diffracting guided light B1b.

The input image IMG0 may be represent displayed information. The input image IMG0 may be represent e.g. graphics and/or text. The input image IMG0 may be represent e.g. video. The engine ENG1 may be arranged to generate still images and/or video. The engine ENG1 may generate a real primary image IMG0 from a digital image. The engine ENG1 may receive one or more digital images e.g. from an internet server or from a smartphone.

The expander device EPE1 may carry virtual image content from the light engine ENG1 to the front of a user's eye EYE1. The expander device EPE1 may expand the viewing pupil, thus enlarging the eye box.

The engine ENG1 may comprise a micro-display DISP1 to generate an input image IMG0. The micro-display DISP1 may comprise a two-dimensional array of light-emitting pixels. The engine ENG1 may comprise e.g. one or more light emitting diodes (LED). The display DISP1 may comprise e.g. one or more micro display imagers, such as liquid crystal on silicon (LCOS), liquid crystal display (LCD), digital micromirror device (DMD). The display DISP1 may generate an input image IMG0 e.g. at a resolution of 1280×720 (HD). The display DISP1 may generate an input image IMG0 e.g. at a resolution of 1920×1080 (Full HD). The display DISP1 may generate an input image IMG0 e.g. at a resolution of 3840×2160 (4K UHD). The input image IMG0 may comprise a plurality of image points P0, P1, P2, . . . . The engine ENG1 may comprise collimating optics LNS1 to form a different light beam from each image pixel. The engine ENG1 may comprise collimating optics LNS1 to form a substantially collimated light beam from light of an image point P0. The center of the display DISP1 and the center of the optics LNS1 may together define an optical axis AX0 of the engine ENG1. The orientation of the optical axis AX0 of the optical engine ENG1 is fixed with respect to the optical engine ENG1. The orientation of the optical axis AX0 is fixed with respect to the display DISP1. The center point of the active area of the display DISP1 and the center of the optics LNS1 may together define the optical axis AX0. The center point (P0) of the input image (IMG0) may coincide with the center point of the active area of the display DISP1. The symbol P0 may also refer to the center point of the active controllable display area of the display DISP1.

The optical axis AX0 may be parallel with an axial light beam ($B3_{P0,R}$) of the input light (IN1), wherein said axial light beam ($B3_{P0,R}$) corresponds to a center point (P0) of the input image (IMG0).

The optical engine ENG1 may be arranged to simultaneously project red light, green light, and blue light, so as to display a multi-color image VIMG1.

The optical engine ENG1 may be arranged to project only one color (e.g. red, green or blue). The expander device may be arranged to display a single-color image VIMG1.

The plate SUB1 may have a first major surface SRF1 and a second major surface SRF2. The surfaces SRF1, SRF2 may be substantially parallel with the plane defined by the directions SX and SY'.

The waveguide plate SUB1 may comprise or consist essentially of transparent solid material. The plate SUB1 may comprise e.g. glass, polycarbonate or polymethyl methacrylate (PMMA). The diffractive optical elements DOE1, DOE3a, DOE3b may be formed e.g. by molding, embossing, and/or etching. The diffractive optical elements may be implemented e.g. by one or more surface diffraction gratings or by one or more volume diffraction gratings.

In particular, the in-coupling element DOE1 may comprise a surface relief diffraction grating, so as to enhance the effect of the tilt angle $\gamma_1$ on the distribution of light to the upper and lower regions REG1, REG2 of the display area DAR1.

In an embodiment, the diffractive elements may be produced by using lithographic techniques. For example, an embossing tool may be produced by e-beam lithography, and the diffraction gratings of the out-coupling elements may be formed by using the embossing tool. Increasing the size of the micro-structured area of the embossing tool may significantly increase production costs of the embossing tool. The rotating expander device may provide an enlarged display area without the need to increase the size of the micro-structured area of the embossing tool.

The waveguide plate may have a thickness $t_{SUB1}$. The waveguide plate comprises a planar waveguiding core. In an embodiment, the plate SUB1 may optionally comprise e.g. one or more cladding layers, one or more protective layers, and/or one or more mechanically supporting layers. The thickness $t_{SUB1}$ may refer to the thickness of a planar waveguiding core of the plate SUB1.

Figure 5B:
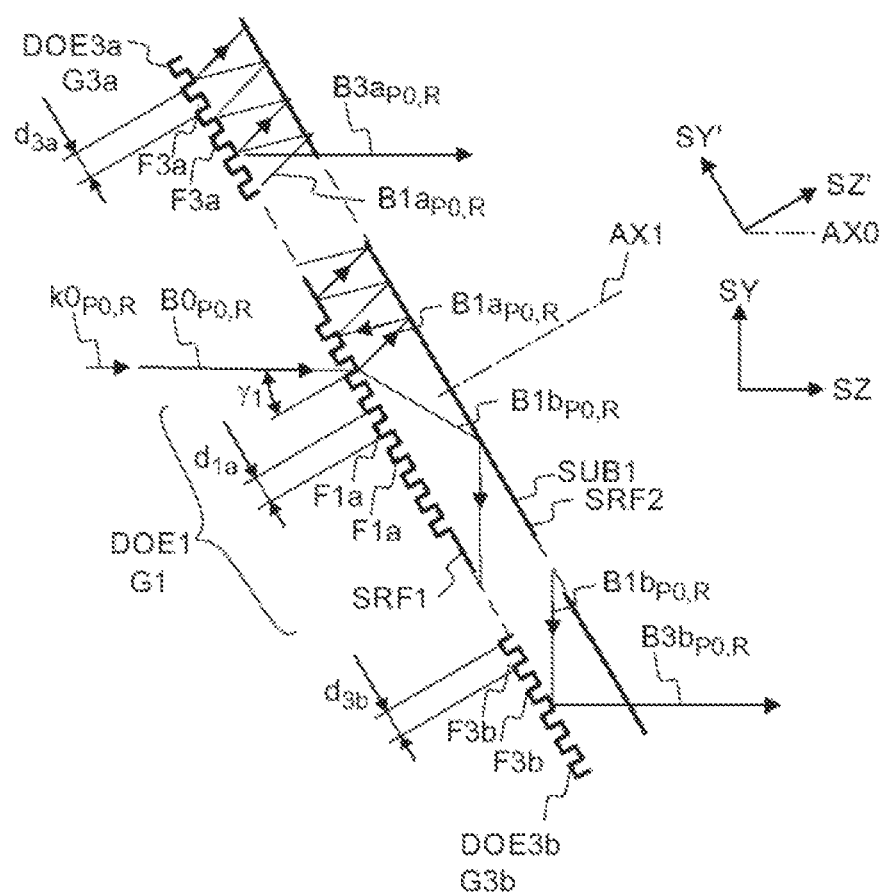
FIG. 5b shows, by way of example, in a cross-sectional side view, coupling, light into the waveguide plate, and coupling light out of the waveguide plate.

Referring to FIG. 5b, the optical engine ENG1 may form a light beam $B0_{P0,R}$, which represents the red color component of the image point P0. The in-coupling element DOE1 may form first guided light $B1a_{P0,R}$ and second guided light $B1b_{P0,R}$ by diffracting light of the light beam $B0_{P0,R}$. The first out-coupling element DOE3a may form an output light beam $B3a_{P0,R}$ by diffracting the first guided light $B1a_{P0,R}$. The second out-coupling element DOE3b may form an output light beam $B3b_{P0,R}$ by diffracting the second guided light $B1b_{P0,R}$.

The in-coupling element DOE1 comprises diffractive features F1a. The out-coupling coupling element DOE3a comprises diffractive features F3a. The out-coupling coupling element DOE3b comprises diffractive features F3b. The in-coupling element DOE1 has a grating period $d_{1a}$. The out-coupling coupling element DOE3a has a grating period $d_{3a}$. The out-coupling coupling element DOE3b has a grating period $d_{3b}$.

The out-coupling elements may be arranged to form the output light beams such that the direction and the intensity of each output light beam may correspond to the position and the brightness of the corresponding image point of the displayed image VIMG1.

The positions and the orientation of the diffractive features of the out-coupling elements may be selected such that output light beams formed by the different out-coupling elements are parallel with each other, in a situation where said output light beams correspond to the same image point of the displayed image.

For example, the out-coupling element DOE3a may form an output light beam $B3a_{P0,R}$, and the out-coupling element DOE3b may form an output light beam $B3b_{P0,R}$ such that the output light beams $B3a_{P0,R}$, $B3b_{P0,R}$ formed by the different out-coupling elements are parallel with each other, in a situation where the output light beams correspond to the same image point (P0) of the displayed image VIMG1. The subscript "R" may refer to red color.

The parallel output light beams may ensure that the displayed image point (P0) visually appears as a single point, and the parallel output light beams may also ensure that rotation of the expander device EPE1 does not cause visually detectable shifting of the displayed image point (P0).

The diffractive features F1a of the tilted in-coupling element DOE1 may be inclined with respect to the optical axis AX0 of the optical engine ENG1. A first coupling efficiency for forming a first guided light beam $B1a_{P0,R}$ from an axial input beam $B0_{P0,R}$ may be different from a second coupling efficiency for forming a second guided light beam $B1b_{P0,R}$ from the axial input beam $B0_{P0,R}$.

Figure 6A:
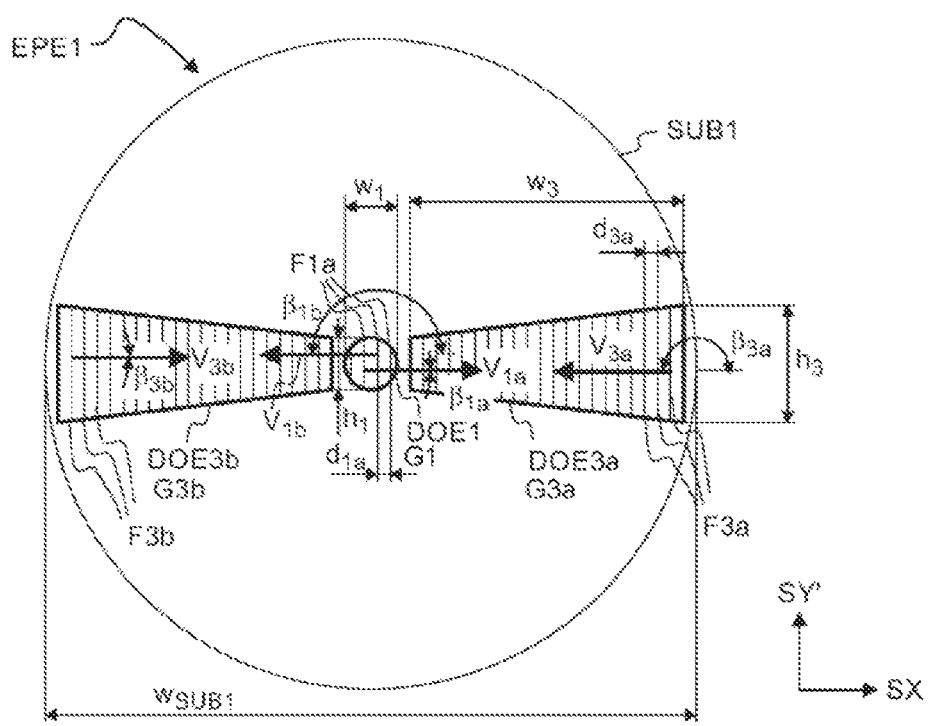
FIG. 6a shows, by way of example, in an axial view, dimensions of diffractive elements.
Figure 6B:
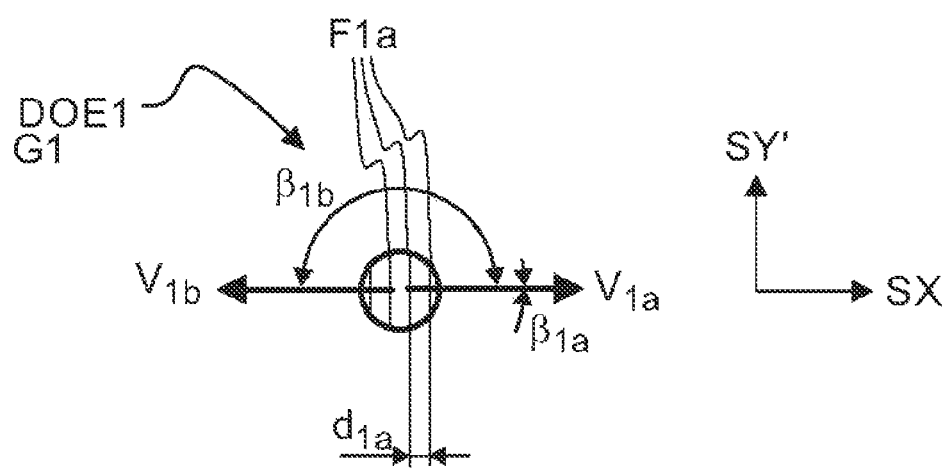
FIG. 6b shows, by way of example, in an axial view, grating vectors of the in-coupling element.

Referring to FIG. 6a, each element DOE1, DOE3a, DOE3b may comprise one or more diffraction gratings to diffract light. The in-coupling element DOE1 may comprise one or more diffraction gratings G1. The out-coupling element DOE3a may comprise a diffraction grating G3a. The out-coupling element DOE3b may comprise a diffraction grating G3b.

The grating period (d) of a diffraction grating and the orientation (13) of the diffractive features of the diffraction grating may specify a grating vector V of said diffraction grating. The diffraction grating comprises a plurality of diffractive features (F1a,F3a,F3b) which may operate as diffractive lines. The diffractive features may be e.g. microscopic ridges or grooves. The diffractive features may be e.g. microscopic protrusions (or recesses), wherein adjacent rows of protrusions (or recesses) may operate as diffractive lines. The grating vector V may be defined as a vector having a direction perpendicular to diffractive lines of the diffraction grating and a magnitude given by $2\pi/d$, where d is the grating period. The grating period means the same as the grating period length. The grating period may be the length between consecutive diffractive features of the grating. The grating period may be equal to a unit length divided by the number of diffractive features located within said unit length. The grating period di a of the in-coupling element DOE1 may be e.g. in the range of 330 nm to 450 nm. The optimum value of a grating period d may depend e.g. on the refractive index of the plate SUB1 and on the wavelength $\lambda$ of the diffracted light.

The grating periods (d) and the orientations (β) of the diffraction gratings of the optical elements may be selected such that the direction ($k3_{P0,R}$) of propagation of light of the center point P0 in the output light OUT1 is parallel with the direction ($k0_{P0,R}$) of propagation of light of the center point P0 in the input light IN1.

The grating periods (d) and the orientations (β) of the diffraction gratings of the optical elements DOE1, DOE3a, DOE3b may be selected such that the direction of each light beam of the output light OUT1 may be parallel with the direction of the corresponding light beam of the input light IN1.

The in-coupling element DOE1 has a first grating vector $V_{1a}$ and a second grating vector $V_{1b}$. The magnitude of the grating vectors $V_{1a}$ may be determined by a grating period di a of a diffraction grating G1 of the in-coupling element DOE1. The diffraction grating G1 may comprise diffractive features F1a. The orientation of the first grating vector $V_{1a}$ may be specified by an angle $\beta_{1a}$ with respect to a reference direction.

The reference direction may be e.g. the direction of the first grating vector $V_{1a}$, in which case the orientation angle $\beta_{1a}$ is equal to zero (i.e. $\beta_{1a}=0°$). The reference direction may also be e.g. the direction SX in a situation where rotation of the expander device EPE1 is stopped. The expander device EPE1 may be rotated and stopped such that the first grating vector $V_{1a}$ is parallel with the direction SX.

The in-coupling element DOE1 has the first grating vector $V_{1a}$ for forming the first guided light B1a by coupling the input light IN1 into the waveguide plate SUB1. The in-coupling element DOE1 has the second grating vector $V_{1b}$ for forming the second guided light B1b by coupling the input light IN1 into the waveguide plate SUB1.

The in-coupling element DOE1 may form guided light B1a, B1b in the directions specified by the grating vectors $V_{1a}$, $V_{1b}$ of the in-coupling element DOE1.

The first out-coupling element DOE3a has a diffraction grating G3a for coupling the first guided light B1a out of the plate SUB1. The grating G3a comprises diffractive features F3a, and has a grating period $d_{3a}$. The direction of the grating vector $V_{3a}$ of the out-coupling element DOE3a is specified by the orientation angle 133a.

The second out-coupling element DOE3b has a diffraction grating G3b for coupling the second guided light B1b out of the plate SUB1. The grating G3b comprises diffractive features F3b, and has a grating period $d_{3b}$. The direction of the grating vector $V_{3b}$ of the out-coupling element DOE3b is specified by the orientation angle $\beta_{3b}$.

The first grating vector $V_{1a}$ has a direction $\beta_{1a}$ and a magnitude $2\pi/d_{1a}$. The second grating vector $V_{1b}$ has a direction $\beta_{1b}$ and a magnitude $2\pi/d_{1a}$. The grating vector $V_{3a}$ has a direction $\beta_{3a}$ and a magnitude $2\pi/d_{3a}$. The grating vector $V_{3b}$ has a direction $\beta_{3b}$ and a magnitude $2\pi/d_{3b}$. The direction (β) of a grating vector may be specified e.g. by the angle between said vector and a reference direction (e.g. direction SX).

The magnitude of the grating vector $V_{1b}$ may be equal to the magnitude of the grating vector $V_{1a}$, and the direction of the grating vector $V_{1b}$ may be opposite to the direction of the grating vector $V_{1a}$.

The first out-coupling element DOE3a may form a portion B3a of output light OUT1. The second out-coupling element DOE3b may form a portion B3b of output light OUT1. The grating vectors $d_{3a}$, $d_{3b}$ of the out-coupling elements DOE3a, DOE3b may be selected such that light beams of the different portions B3a, B3b of the output light OUT1 are parallel with each other, in a situation where said light beams correspond to the same image point (P0) of the displayed image. In particular, the grating period $d_{3a}$ of the out-coupling element DOE3a, and the grating period $d_{3b}$ of the out-coupling element DOE3b may be selected to be equal to the grating period di a of the in-coupling element DOE1.

$w_1$ denotes the width of the in-coupling element DOE1. $h_1$ denotes the height of the in-coupling element DOE1. $w_3$ denotes the width of the out-coupling element DOE3a. $h_3$ denotes the height of the out-coupling element DOE3a. $w_{SUB1}$ denotes the width of the substrate plate SUB1. The widths $w_1$, $w_3$, $w_{SUB1}$ may be defined in the direction of the grating vector $V_{1a}$.

The grating periods (d) and the directions (13) of the grating vectors of the out-coupling elements DOE3a, DOE3b may be selected such that the following conditions are fulfilled. Consequently, output beams provided by the different out-coupling elements may be parallel with each other, said output beams corresponding to an image point of the displayed image.

$$V_{1a}+V_{3a}=0 \tag{2a}$$

$$V_{1b}+V_{3b}=0 \tag{2b}$$

The positions of diffractive features F3a of the first out-coupling element DOE3a may be selected such that the sum of the first input grating vector via and the first output grating vector $V_{3a}$ is equal to zero.

The positions of diffractive features F3b of the second out-coupling element DOE3b may be selected such that the sum of the second input grating vector $v_{1b}$ and the second output grating vector $V_{3b}$ is equal to zero.

Equations (2a) and (2b) specify conditions for the vector sum of the grating vectors. Each term on the left-hand side of the equations (2a) and (2b) is vector, which has a magnitude and a direction.

In an embodiment, the waveguide plate SUB1 of the expander device EPE1 may be transparent so that external light EX1 may propagate through the waveguide plate SUB1 in the axial direction (AX0, SZ). For example, a user USER1 may observe an external object OBJ1 through the waveguide plate SUB1 simultaneously when viewing the displayed virtual image VIMG1. The external light EX1 may be propagate from an external object OBJ1 through the waveguide plate SUB1 to the eye EYE1 of the user USER1.

In an embodiment, the waveguide plate SUB1 may comprise cut-outs or openings so that external light EX1 may propagate via the cut-outs or openings in the axial direction (AX0, SZ). The external light EX1 may be propagate from an external object OBJ1 via the cut-outs or openings to the eye EYE1 of the user USER1.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. A display apparatus (500) for displaying a virtual image (VIMG1), the display apparatus (500) comprising:
an optical engine (ENG1) to form input light (IN1), which represents an input image (IMG0),
an expander device (EPE1) to form light beams ($B3_{P0,R}$, $B3_{P1,R}$) of output light (OUT1) by expanding light beams ($B0_{P0,R}$, $B0_{P1,R}$) of the input light (IN1), the expander device (EPE1) comprising:
- a waveguide plate (SUB1),
- a diffractive in-coupling element (DOE1) to form first guided light (B1a) and second guided light (B1b) by coupling the input light (IN1) into the waveguide plate (SUB1),
- a first out-coupling element (DOE3a) to form output light (OUT1) by coupling the first guided light (B1a) out of the waveguide plate (SUB1), and
- a second out-coupling element (DOE3b) to form output light (OUT1) by coupling the second guided light (B1b) out of the waveguide plate (SUB1), wherein the display apparatus (500) comprises a base (BASE1) and an actuating mechanism (MOTOR1) to cause rotary motion of the expander device (EPE1) with respect to the base (BASE1), wherein an angle ($\gamma 1$) between an optical axis (AX0) of the optical engine (ENG1) and the axis (AX1) of rotation of the expander device (EPE1) is in the range of 10° to 45°.

2. The display apparatus (500) of claim 1, wherein the optical axis (AX0) of the optical engine (ENG1) is parallel with an axial light beam ($B3_{P0,R}$) of the input light (IN1), wherein said axial light beam ($B3_{P0,R}$) corresponds to a center point (P0) of the input image (IMG0).

3. The display apparatus (500) of claim 1, wherein the diffractive in-coupling element (DOE1) comprises a surface relief diffraction grating (G1).

4. The display apparatus (500) of claim 1,
wherein the in-coupling element (DOE1) has a first input grating vector ($V_{1a}$) and a second opposite input grating vector ($V_{1b}$),
wherein the first out-coupling element (DOE3a) has a first output grating vector ($V_{3a}$),
wherein the second out-coupling element (DOE3b) has a second output grating vector ($V_{3b}$),
wherein the sum of the first input grating vector ($V_{1a}$) and the first output grating vector ($V_{3a}$) is equal to zero,
wherein the sum of the second input grating vector ($V_{1b}$) and the second output grating vector ($V_{3b}$) is equal to zero.

5. The display apparatus (500) of claim 1, wherein the optical engine (ENG1) is arranged to form the input image (IMG0) and to convert the input image (IMG0) into a plurality of input light beams ($B0_{P0,R}$, $B0_{P1,R}$) of the input light (IN1), wherein the expander device (EPE1) is arranged to form light beams ($B3_{P0,R}$, $B3_{P1,R}$) of output light (OUT1) by expanding the input light beams ($B0_{P0,R}$, $B0_{P1,R}$) of the input light (IN1).

6. A vehicle (1000), comprising the display apparatus (500) of claim 1.

7. A method for displaying a virtual image (VIMG1), the method comprising:
- providing a plurality of input light beams ($B0_{P0,R}$, $B0_{P1,R}$) by using an optical engine (ENG1) such that the input light beams ($B0_{P0,R}$, $B0_{P1,R}$) correspond to image points (P0, P1) of an input image (IMG0),
- forming output light beams ($B3_{P0,R}$, $B3_{P1,R}$) of output light (OUT1) by using an expander device (EPE1) to expand the input light beams ($B0_{P0,R}$, $B0_{P1,R}$) of the input light (IN1), and
- causing a rotary motion of the expander device (EPE1), the expander device (EPE1) comprising:
- a waveguide plate (SUB1),
- an in-coupling element (DOE1) to form first guided light (B1a) and second guided light (B1b) by coupling input light (IN1) into the waveguide plate (SUB1),
- a first out-coupling element (DOE3a) to form output light (OUT1) by coupling the first guided light (B1a) out of the waveguide plate (SUB1), and
- a second out-coupling element (DOE3b) to form output light (OUT1) by coupling the second guided light (B1b) out of the waveguide plate (SUB1), wherein an angle ($\gamma 1$) between an optical axis (AX0) of the optical engine (ENG1) and the axis (AX1) of rotation of the expander device (500) is in the range of 10° to 45°.

* * * * *